(12) United States Patent
Yoshida

(10) Patent No.: US 12,365,371 B2
(45) Date of Patent: Jul. 22, 2025

(54) CONTROL DEVICE, ELECTRICAL RAILWAY VEHICLE, AND CONTROL METHOD

(71) Applicant: Mitsubishi Electric Corporation, Tokyo (JP)

(72) Inventor: Yuki Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 30 days.

(21) Appl. No.: 18/559,445

(22) PCT Filed: Jul. 8, 2021

(86) PCT No.: PCT/JP2021/025794
§ 371 (c)(1),
(2) Date: Nov. 7, 2023

(87) PCT Pub. No.: WO2023/281700
PCT Pub. Date: Jan. 12, 2023

(65) Prior Publication Data
US 2024/0375695 A1 Nov. 14, 2024

(51) Int. Cl.
*B61L 15/00* (2006.01)
*B60L 3/00* (2019.01)
(Continued)

(52) U.S. Cl.
CPC ......... *B61L 15/0063* (2013.01); *B60L 3/0061* (2013.01); *B60L 15/20* (2013.01);
(Continued)

(58) Field of Classification Search
CPC ...... H02P 5/74; H02P 29/028; B61L 15/0063; B61L 15/0081; B60L 3/0061; B60L 2200/26; B60L 2240/421; B60L 2240/461
See application file for complete search history.

(56) References Cited

U.S. PATENT DOCUMENTS

2013/0152817 A1* 6/2013 Kral ..................... H02H 7/0811
105/54
2013/0307577 A1* 11/2013 Falkenstein ............ G01R 31/34
324/765.01
(Continued)

FOREIGN PATENT DOCUMENTS

JP 2018093724 A 6/2018

OTHER PUBLICATIONS

International Search Report (PCT/ISA/210) with English translation and Written Opinion (PCT/ISA/237) mailed on Sep. 14, 2021, by the Japanese Patent Office as the International Searching Authority for International Application No. PCT/JP2021/025794.

*Primary Examiner* — John M Zaleskas
(74) *Attorney, Agent, or Firm* — BUCHANAN, INGERSOLL & ROONEY PC

(57) ABSTRACT

A control device includes a power converter, reference rotational speed obtainer, and abnormality determiner. The power converter feeds power to motors. The reference rotational speed obtainer, when rotational speed sensors are determined to include a suspected abnormal sensor suspected of having abnormality, obtains a reference rotational speed from signals output from the rotational speed sensors other than the suspected abnormal sensor and indicating rotational speeds. The abnormality determiner determines that the motor corresponding to the suspected abnormal sensor has abnormality when the difference between a modulation factor obtained from a command value of voltage output from the power converter and a comparative modulation factor set in advance is larger than or equal to a modulation-factor threshold, and determines that the suspected abnormal sensor has abnormality when the difference between the modulation factor obtained from the reference
(Continued)

rotational speed and the comparative modulation factor is smaller than the modulation-factor threshold.

20 Claims, 9 Drawing Sheets

(51) Int. Cl.
  B60L 15/20 (2006.01)
  H02P 5/74 (2006.01)
  H02P 29/028 (2016.01)

(52) U.S. Cl.
  CPC ............ B61L 15/0081 (2013.01); H02P 5/74 (2013.01); H02P 29/028 (2013.01); B60L 2200/26 (2013.01); B60L 2240/421 (2013.01); B60L 2240/461 (2013.01)

(56) References Cited

U.S. PATENT DOCUMENTS

| | | | | |
|---|---|---|---|---|
| 2013/0320900 A1* | 12/2013 | Daigle | ................ | B60L 15/2063 |
| | | | | 318/434 |
| 2014/0240874 A1* | 8/2014 | Kral | ..................... | B60L 3/0061 |
| | | | | 361/23 |
| 2016/0142004 A1* | 5/2016 | Otani | .................. | H02P 29/0243 |
| | | | | 318/806 |
| 2023/0339331 A1* | 10/2023 | Matsuyama | ............ | G01P 3/481 |

* cited by examiner

CONTROL DEVICE, ELECTRICAL RAILWAY VEHICLE, AND CONTROL METHOD

TECHNICAL FIELD

The present disclosure relates to a control device, an electric railway vehicle, and a control method.

BACKGROUND ART

Electric railway vehicles (hereinafter referred to as "electric vehicles") include motors and control devices for feeding electric power to the motors. Some of the control devices include inverter units for converting DC power fed from the outside into three-phase AC power and feeding the three-phase AC power to the motors.

The control of the motors executed by the control devices may be subject to various abnormalities. For the purpose of detection of such abnormalities, for example, a control device disclosed in Patent Literature 1 determines that an abnormality occurs when a pulse width modulation (PWM) factor of an inverter unit is higher than a reference value in a vehicle running at a low velocity.

CITATION LIST

Patent Literature

Patent Literature 1: Unexamined Japanese Patent Application Publication No. 2018-93724

SUMMARY OF INVENTION

Technical Problem

The control device controls the operations of motors on the basis of feedback of rotational speeds of the motors. The motors are thus typically provided with rotational speed sensors for measuring the rotational speeds of the motors. The rotational speed sensors having any abnormality prevent the control device from properly controlling the operations of the motors. The control device is required to detect such an abnormality in the rotational speed sensors. The control device disclosed in Patent Literature 1, however, is not able to determine the occurrence of an abnormality in the rotational speed sensors.

An objective of the present disclosure, which has been accomplished in view of the above problems, is to determine the occurrence of an abnormality in the rotational speed sensors for measuring rotational speeds of motors.

Solution to Problem

In order to achieve the above objective, a control device according to the present disclosure controls operations of a plurality of motors of an electric railway vehicle running in accordance with an operation command signal. The control device includes a power converter, a suspected abnormal sensor determiner, a reference rotational speed obtainer, a command value determiner, a modulation factor obtainer, and an abnormality determiner. The power converter feeds electric power to each of the plurality of motors. The suspected abnormal sensor determiner determines, based on signals that are output from a plurality of rotational speed sensors provided for the plurality of motors in one-to-one correspondence and that indicate rotational speeds of the plurality of motors, whether the plurality of rotational speed sensors include a suspected abnormal sensor suspected of having an abnormality. Each of the signals is output from a corresponding rotational speed sensor of the plurality of rotational speed sensors and indicates a rotational speed of a corresponding motor of the plurality of motors. The reference rotational speed obtainer obtains a reference rotational speed, based on one or more signals that are output from the plurality of rotational speed sensors other than the suspected abnormal sensor and that each indicate the rotational speed, when the suspected abnormal sensor determiner determines that the plurality of rotational speed sensors include the suspected abnormal sensor. Each of the one or more signals is output from a corresponding rotational speed sensor of the plurality of rotational speed sensors other than the suspected abnormal sensor. The command value determiner determines a command value of voltage to be output from the power converter, based on the operation command signal, the reference rotational speed, and values of current fed from the power converter to the motors. The modulation factor obtainer obtains a modulation factor based on the command value of voltage. The abnormality determiner determines that a motor of the plurality of motors that corresponds to the suspected abnormal sensor has an abnormality, when the difference between the modulation factor and a comparative modulation factor that is set in advance is larger than or equal to a modulation-factor threshold. The abnormality determiner determines that the suspected abnormal sensor has an abnormality, when the difference between the modulation factor and the comparative modulation factor is smaller than the modulation-factor threshold.

Advantageous Effects of Invention

According to the present disclosure, the suspected abnormal sensor determiner determines whether the plurality of rotational speed sensors include a suspected abnormal sensor suspected of having an abnormality. The abnormality determiner determines whether the difference between the modulation factor obtained based on the command value and the comparative modulation factor that is set in advance is larger than or equal to the modulation-factor threshold, and can thus determine the occurrence of an abnormality in the plurality of rotational speed sensors.

DESCRIPTION OF EMBODIMENTS

The following describes a control device, an electric railway vehicle, and a control method according to embodiments of the present disclosure, with reference to the accompanying drawings. The electric railway vehicle is hereinafter referred to as "electric vehicle".

Embodiment 1

Figure 1:
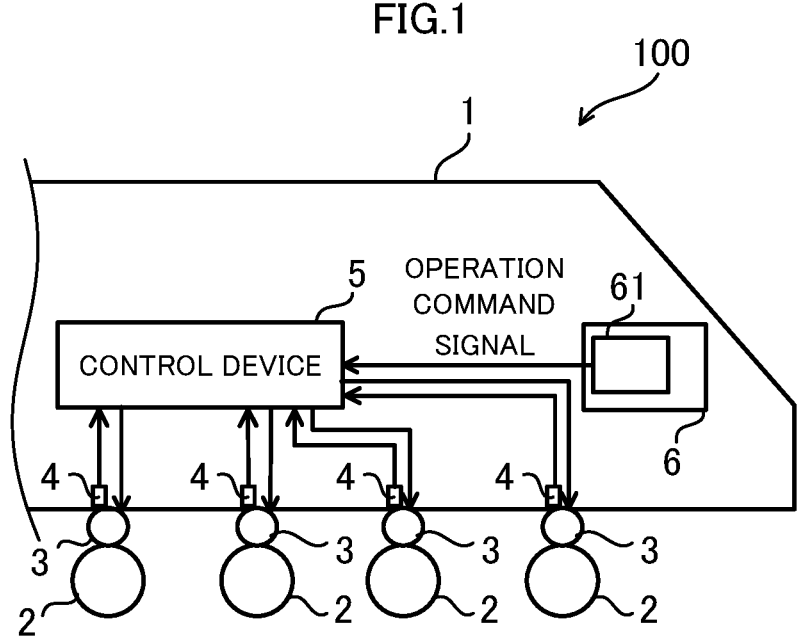
FIG. 1 is a schematic diagram illustrating a configuration of an electric railway vehicle according to Embodiment 1.

As illustrated in FIG. 1, an electric vehicle 100 according to Embodiment 1 includes a vehicle body 1, wheels 2 provided to the vehicle body 1, motors 3 to rotate the wheels 2, rotational speed sensors 4 to measure rotational speeds of the motors 3, a control device 5 to control the rotation of the motors 3, and a driver cab 6 to output an operation command signal. The cab 6 is manipulated by a train operator, and includes a master controller 61 to output an operation command signal. The electric vehicle 100 runs in accordance with an operation command signal. The operation command signal contains a power running command, a braking command, or another command, to indicate a direct or indirect instruction for a velocity of the electric vehicle 100 and rotational speeds of the motors 3.

The wheels 2 support the vehicle body 1 and rotate in accordance with driving forces of the motors 3. The rotating wheels 2 cause the vehicle body 1 to run. This embodiment assumes that each car of the electric vehicle has four pairs of wheels 2. Each pair of wheels 2 is fixed at both ends of an axle.

The motors 3 rotate in response to application of three-phase AC voltage, and rotate the wheels 2 via the corresponding axles. Examples of the motors 3 include a three-phase induction motor.

The electric vehicle 100 is made of motor cars each having the motors 3 and trailers having no motors 3. The motors 3 are provided for the respective axles of the motor car. Each motor car has four motors 3 in this embodiment.

The rotational speed sensors 4 are provided for the motors 3 in one-to-one correspondence. Each of the rotational speed sensors 4 outputs, to the control device 5, a signal indicating a rotational speed of the corresponding motor 3. The signals indicating rotational speeds of the motors 3 are hereinafter referred to as "rotational speed signals". The rotational speed sensors 4 include rotary encoders, tachogenerators, pulse generators, or the like. The rotational speed sensors 4 in this embodiment are each a pulse generator to output a pulse signal having a pulsed waveform in response to every rotation of the rotational axis of the corresponding motor 3 by a predetermined angle. The rotational speed signals, that is, pulse signals output from the rotational speed sensors 4 are fed to the control device 5.

The control device 5 controls operations of the motors 3 on the basis of the operation command signal and the rotational speed signals. The control device 5 drives the motors 3, and determines the occurrence of an abnormality in the motors 3 or the rotational speed sensors 4.

The control device 5 has a configuration, which is described in detail below with reference to FIG. 2. The control device 5 is installed in the vehicle body 1 of each motor car having the motors 3. That is, the vehicle body 1 of each motor car has a single control device 5, four motors 3, and four rotational speed sensors 4 in this embodiment.

The control device 5 includes a power converter 51 to convert electric power into another electric power and feed the converted electric power to each of the four motors 3, a controller 52 to control the operation of the power converter 51, and current measurers 53 to measure values of current flowing between the power converter 51 and the motors 3, that is, values of current fed from the power converter 51 to the motors 3.

The power converter 51 includes an inverter unit to convert DC power, fed from a DC overhead wire via a current collector, into three-phase AC power and to feed the three-phase AC power to the motors 3. The power converter 51 controls the operation of the inverter unit and can thus perform control of the electric power to be fed to the motors 3 with respect to effective voltage, effective current, frequency, phase, and the like.

The current measurers 53 measure values of current flowing through the respective phases between the power converter 51 and the motors 3, and output current value signals indicating the current values to the controller 52. The current measurers 53 are not necessarily provided for all the three phases like those illustrated in FIG. 2, and may be provided for only two of the three phases.

The controller 52 receives the operation command signal output from the master controller 61, which is described above with reference to FIG. 1, the current value signals output from the current measurers 53, and the rotational speed signals output from the rotational speed sensors 4. The controller 52 executes vector control of the motors 3 on the basis of the current value signals and the rotational speed signals. The controller 52 determines rotational speeds and rotational torques of the motors 3, and determines parameters, such as voltage value, current value, and frequency, of electric power to be output from the power converter 51. This command value of voltage to be output from the power converter 51 is hereinafter referred to as "voltage command value". The controller 52 performs control for applying a voltage indicated by the determined voltage command value to the motors 3 and thus drives the motors 3.

Figure 2:
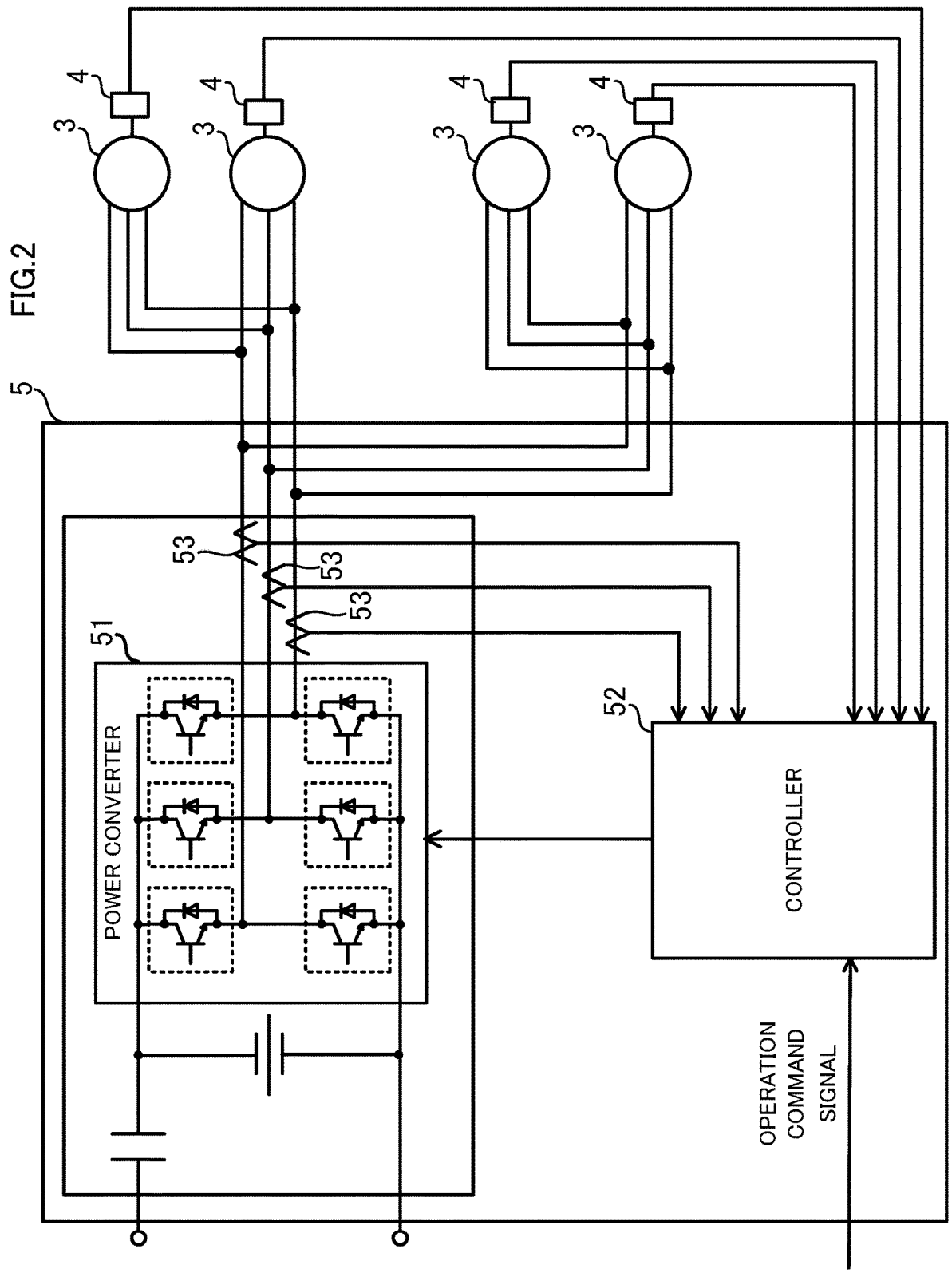
FIG. 2 is a block diagram illustrating configurations of a control device, motors, and rotational speed sensors according to Embodiment 1.
Figure 3:
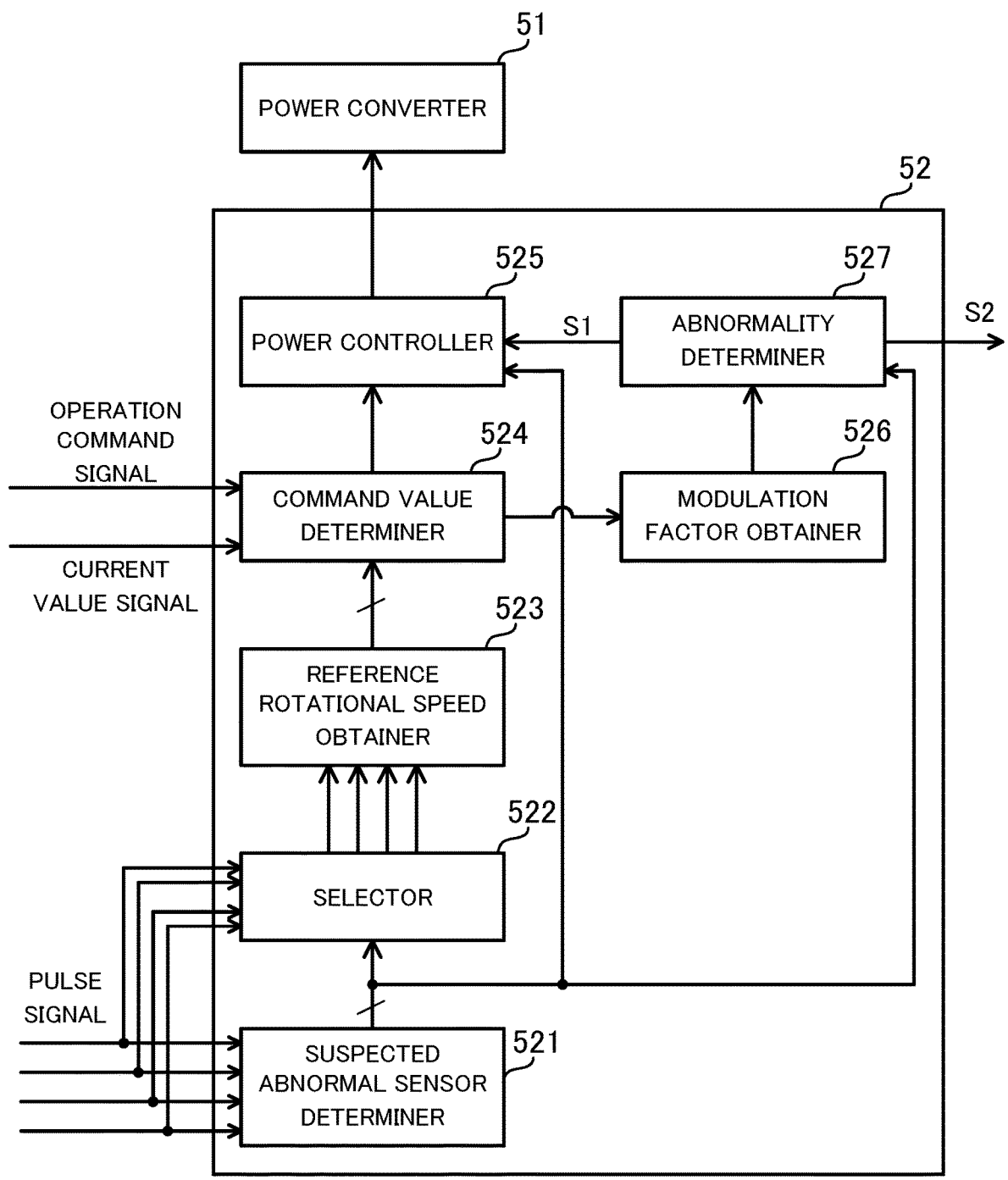
FIG. 3 is a block diagram illustrating a configuration of a controller according to Embodiment 1.

The following describes a configuration of the controller 52 in detail with reference to FIGS. 2 and 3.

The controller 52 includes a suspected abnormal sensor determiner 521 to determine whether any of the rotational speed sensors 4 is suspected of having an abnormality, a selector 522 to select rotational speed signals to be transferred to the reference rotational speed obtainer 523 among the rotational speed signals output from the four rotational speed sensors 4, a reference rotational speed obtainer 523 to obtain a reference rotational speed on the basis of the rotational speed signals selected by the selector 522, a command value determiner 524 to determine a command value of electric power to be output from the power converter 51, a power controller 525 to control the operation of the power converter 51, a modulation factor obtainer 526 to obtain a modulation factor on the basis of the command value of electric power, and an abnormality determiner 527 to determine whether the four motors 3 or the four rotational speed sensors 4 have any abnormality on the basis of the modulation factor.

The suspected abnormal sensor determiner 521 receives pulse signals from the four rotational speed sensors 4. On the basis of the received pulse signals, the suspected abnormal sensor determiner 521 determines whether any of the four rotational speed sensors 4 is suspected of having an abnormality. Being suspected of having an abnormality is hereinafter referred to as "suspected abnormal", and a rotational speed sensor 4 suspected of having an abnormality is referred to as "suspected abnormal sensor". The definition of abnormalities encompasses failures and means a state of being unable to perform an expected function or performance.

The suspected abnormal sensor determiner 521 determines whether the frequency of a pulse signal output from each of the four rotational speed sensors 4 is larger than or equal to a reference frequency during a measurement period that is set in advance, and thus determines whether the four rotational speed sensors 4 include a suspected abnormal sensor. The measurement period is one minute, for example. The reference frequency is set, in advance, to a value equal to or lower than the frequencies of pulse signals that are to be output from the rotational speed sensors 4 in normal states while the motors 3 are rotating properly. The suspected abnormal sensor determiner 521 determines a rotational speed sensor 4 that outputs a pulse signal having a frequency equal to or higher than the reference frequency to be normal. When determining all the rotational speed sensors 4 to be normal, the suspected abnormal sensor determiner 521 determines that no rotational speed sensor 4 is suspected of having an abnormality. In contrast, when determining that any of the rotational speed sensors 4 outputs a pulse signal having a frequency lower than the reference frequency, the suspected abnormal sensor determiner 521 determines this rotational speed sensor 4 as suspected abnormal, and determines that the four rotational speed sensors 4 include a suspected abnormal sensor.

The suspected abnormal sensor determiner 521 regards a rotational speed sensor 4 as a suspected abnormal sensor, (i) in the case where the rotational speed sensor 4 actually has an abnormality or failure, or (ii) in the case where the motor 3 corresponding to the rotational speed sensor 4 fails to properly rotate due to jamming in the motor 3 regardless of the normal state of the rotational speed sensor 4. The state in which "jamming occurs" is a state in which the motor 3 is inhibited from achieving smooth rotation, for example, because of anchoring of the output shaft of the motor 3. The state in which "jamming occurs" is a state in which the motor 3 is implied by, for example, a rotational speed of the motor 3 lower than a threshold speed defined by a designer or an engineer.

The suspected abnormal sensor determiner 521, when determining that the rotational speed sensors include a suspected abnormal sensor, outputs a determination signal, containing information indicating the existence of a suspected abnormal sensor and information for identifying the suspected abnormal sensor, to the selector 522, the power controller 525, and the abnormality determiner 527. The suspected abnormal sensor determiner 521 also determines whether the pulse signals include a pulse signal corresponding to the suspected abnormal sensor. When determining that the pulse signals include a pulse signal corresponding to the suspected abnormal sensor, the suspected abnormal sensor determiner 521 outputs a determination signal further containing information indicating that this pulse signal corresponds to the suspected abnormal sensor as well as the above-mentioned information.

The selector 522 receives the pulse signals output from the respective rotational speed sensors 4, and the determination signal output from the suspected abnormal sensor determiner 521. When receiving a determination signal indicating the existence of a suspected abnormal sensor, the selector 522 provides the reference rotational speed obtainer 523 with the pulse signals received from the rotational speed sensors 4 other than the suspected abnormal sensor indicated by the determination signal. When receiving a determination signal indicating that the pulse signals contain a pulse signal corresponding to the suspected abnormal sensor, the selector 522 does not provide the reference rotational speed obtainer 523 with the pulse signal corresponding to the suspected abnormal sensor indicated by the determination signal.

The selector 522 completes the selection of pulse signals to be provided to the reference rotational speed obtainer 523, and then outputs a selection completion signal indicating completion of selection of pulse signals. The selection completion signal is fed to the power controller 525.

The reference rotational speed obtainer 523 receives the pulse signals selected by the selector 522. On the basis of the received pulse signals, the reference rotational speed obtainer 523 obtains a reference rotational speed for determining a voltage to be output from the power converter 51. In detail, the reference rotational speed obtainer 523 obtains, on the basis of the received pulse signals, the rotational speeds of the motors 3 indicated by the respective values of the received pulse signals. The reference rotational speed obtainer 523, upon obtaining the rotational speeds of the motors 3, calculates an average of the obtained rotational speeds. This average rotational speed is hereinafter referred to as "reference rotational speed". The reference rotational speed may be, instead of the average of the rotational speeds of the motors 3 calculated from the pulse signals output from the rotational speed sensors 4 determined to be normal, the median or a representative value of the rotational speeds of the motors 3, for example.

In response to the determination that the four rotational speed sensors 4 include a suspected abnormal sensor, the reference rotational speed obtainer 523 obtains a reference rotational speed on the basis of the pulse signals output from the respective rotational speed sensors 4 other than the suspected abnormal sensor. In specific, in the case where the rotational speed sensors 4 are determined to include a single suspected abnormal sensor and three normal sensors, the reference rotational speed obtainer 523 obtains a reference rotational speed from the pulse signals output from the three rotational speed sensors 4 determined to be normal. In contrast, in response to the determination that the four rotational speed sensors 4 include no suspected abnormal sensor, the reference rotational speed obtainer 523 obtains a reference rotational speed on the basis of the pulse signals output from the four rotational speed sensors 4. The reference rotational speed obtained on the basis of the pulse signals output from the respective rotational speed sensors 4 other than the suspected abnormal sensor is hereinafter referred to as "first reference rotational speed". The reference rotational speed obtained on the basis of the pulse signals output from all the rotational speed sensors 4 is referred to as "second reference rotational speed". The first reference rotational speed corresponds to the "reference rotational speed". The reference rotational speed obtainer 523 outputs reference rotational speed information indicating the first reference rotational speed or the second reference rotational speed.

The command value determiner 524 receives the operation command signal output from the master controller 61 illustrated in FIG. 1, the reference rotational speed information output from the reference rotational speed obtainer 523, and the current value signals output from the current measurers 53. On the basis of the operation command signal, the reference rotational speed information, and the current value signals, the command value determiner 524 determines a command value of voltage to be output from the power converter 51. The command value of voltage is hereinafter referred to as "voltage command value".

The command value determiner 524 refers to different pieces of information to determine a voltage command value, depending on a velocity of the vehicle body 1. In an exemplary case where the vehicle velocity or the velocity of the vehicle body 1 is lower than a vehicle velocity threshold that is set in advance, that is, the rotational speeds of the motors 3 are lower than a threshold, the command value determiner 524 determines a voltage command value within such a range that the fed-back current values are at most a "overcurrent set value" that is set in advance. The voltage command value is determined to minimize the deviation between the present vehicle velocity and the vehicle velocity instructed by an operation command indicated by the operation command signal. The vehicle velocity is obtained on the basis of the reference rotational speed information, for example. The vehicle velocity threshold and the overcurrent set value are stored in a storage area of the controller 52, for example. The threshold velocity is 30 km/h, for example.

In another exemplary case where the vehicle velocity is equal to or higher than the threshold velocity, the command value determiner 524 determines a voltage command value that minimizes the deviation between the present vehicle velocity and the vehicle velocity instructed by the operation command, without using the values of current measured by the current measurers 53, which are smaller than the back electromotive forces generated by rotation of the motors 3.

The command value determiner 524 provides the power controller 525 and the modulation factor obtainer 526 with command value information indicating the determined voltage command value.

The power controller 525 controls the operation of the inverter unit of the power converter 51 on the basis of the voltage command value, and performs pulse width modulation (PWM) of a DC voltage. The power controller 525 thus causes the power converter 51 to output the effective voltage indicated by the voltage command value.

The power controller 525 halts the operation of the power converter 51 when the determination signal fed from the suspected abnormal sensor determiner 521 indicates the existence of a suspected abnormal sensor.

The modulation factor obtainer 526 receives the command value information output from the command value determiner 524, and obtains a modulation factor on the basis of the voltage command value indicated by the command value information. In detail, the modulation factor obtainer 526 obtains a modulation factor by dividing the voltage command value indicated by the command value information by the maximum output voltage of the control device 5. A large modulation factor implies a higher voltage required for actual rotation of the motors 3 relative to the maximum output voltage. A small modulation factor implies a lower voltage required for actual rotation of the motors 3 relative to the maximum output voltage. The modulation factor obtainer 526 outputs modulation factor information indicating the obtained modulation factor.

The abnormality determiner 527 receives the modulation factor information obtained by the modulation factor obtainer 526. The abnormality determiner 527 also receives the determination signal from the suspected abnormal sensor determiner 521. When the determination signal from the suspected abnormal sensor determiner 521 indicates the existence of a suspected abnormal sensor, the abnormality determiner 527 determines whether the difference between the modulation factor and a comparative modulation factor, which is a modulation factor in the case of no jamming in the motors 3, is larger than or equal to a first modulation-factor threshold that is set in advance. The first modulation-factor threshold is a threshold for determination of whether jamming occurs in the motors 3 and is an example of "jamming-modulation-factor threshold". The first modulation-factor threshold is set to a value contributing to determination of the occurrence of jamming in the motors 3. The first modulation-factor threshold is stored in the storage area of the controller 52, for example.

The abnormality determiner 527 locates the abnormality on the basis of a result of determination. In detail, the abnormality determiner 527 determines whether the difference between the modulation factor obtained on the basis of the first reference rotational speed and the comparative modulation factor is larger than or equal to the first modulation-factor threshold.

When determining that the difference between the modulation factor and the comparative modulation factor is larger than or equal to the first modulation-factor threshold, the abnormality determiner 527 determines that jamming as an abnormality occurs in the motor 3 corresponding to the suspected abnormal sensor.

When determining that jamming occurs in the motor 3, the abnormality determiner 527 outputs first abnormality occurrence information S1 indicating that jamming occurs in the motor 3. The first abnormality occurrence information S1 is fed to the power controller 525. The power controller 525, when receiving the first abnormality occurrence information S1, halts the operation of the power converter 51.

In contrast, when determining that the difference between the modulation factor and the comparative modulation factor is smaller than the first modulation-factor threshold, the abnormality determiner 527 determines that the rotational speed sensor 4 corresponding to the suspected abnormal sensor has an abnormality. In this case, the abnormality determiner 527 outputs second abnormality occurrence information S2 indicating that the rotational speed sensors 4 have an abnormality. The second abnormality occurrence information S2 is fed to the driver cab 6, which is described above with reference to FIG. 1. The driver cab 6, upon receiving the second abnormality occurrence information S2, causes a monitor in the driver cab 6 to display information indicating an abnormality in the rotational speed sensors 4, for example.

The following describes a process of controlling the operations of the motors 3 executed by the control device 5 having the above-described configuration, with reference to FIGS. 1 to 5.

Figure 4:
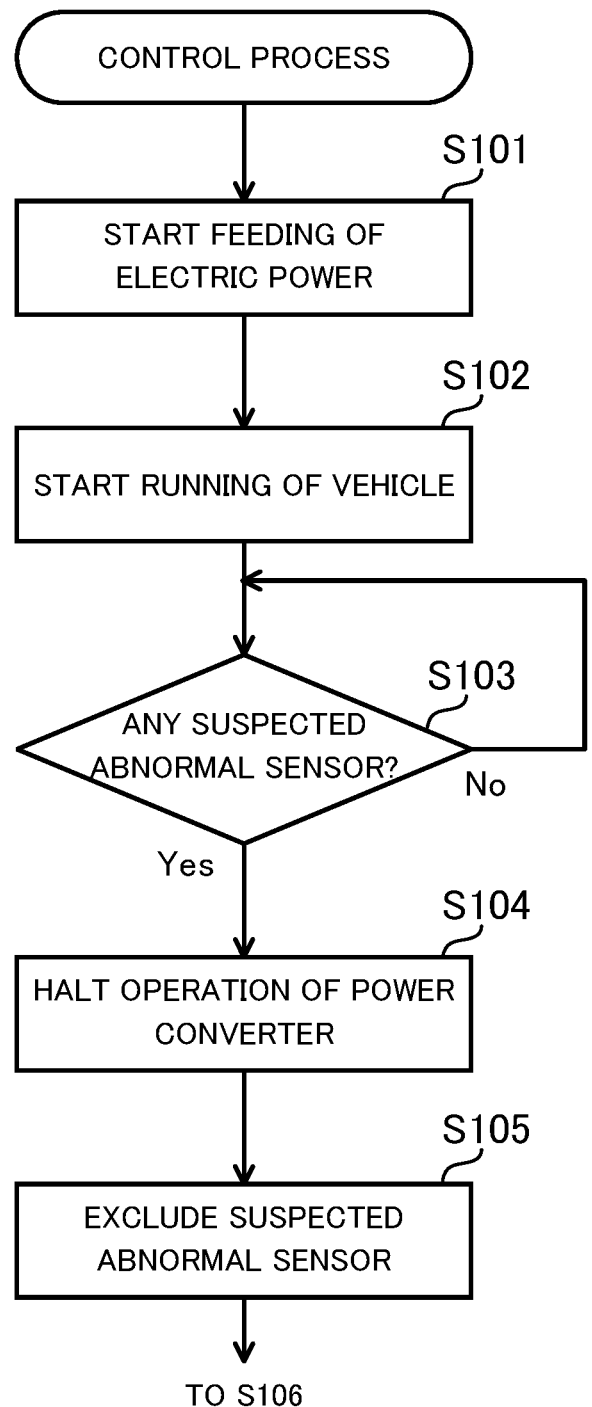
FIG. 4 is a flowchart illustrating the first half of a control process according to Embodiment 1.
Figure 5:
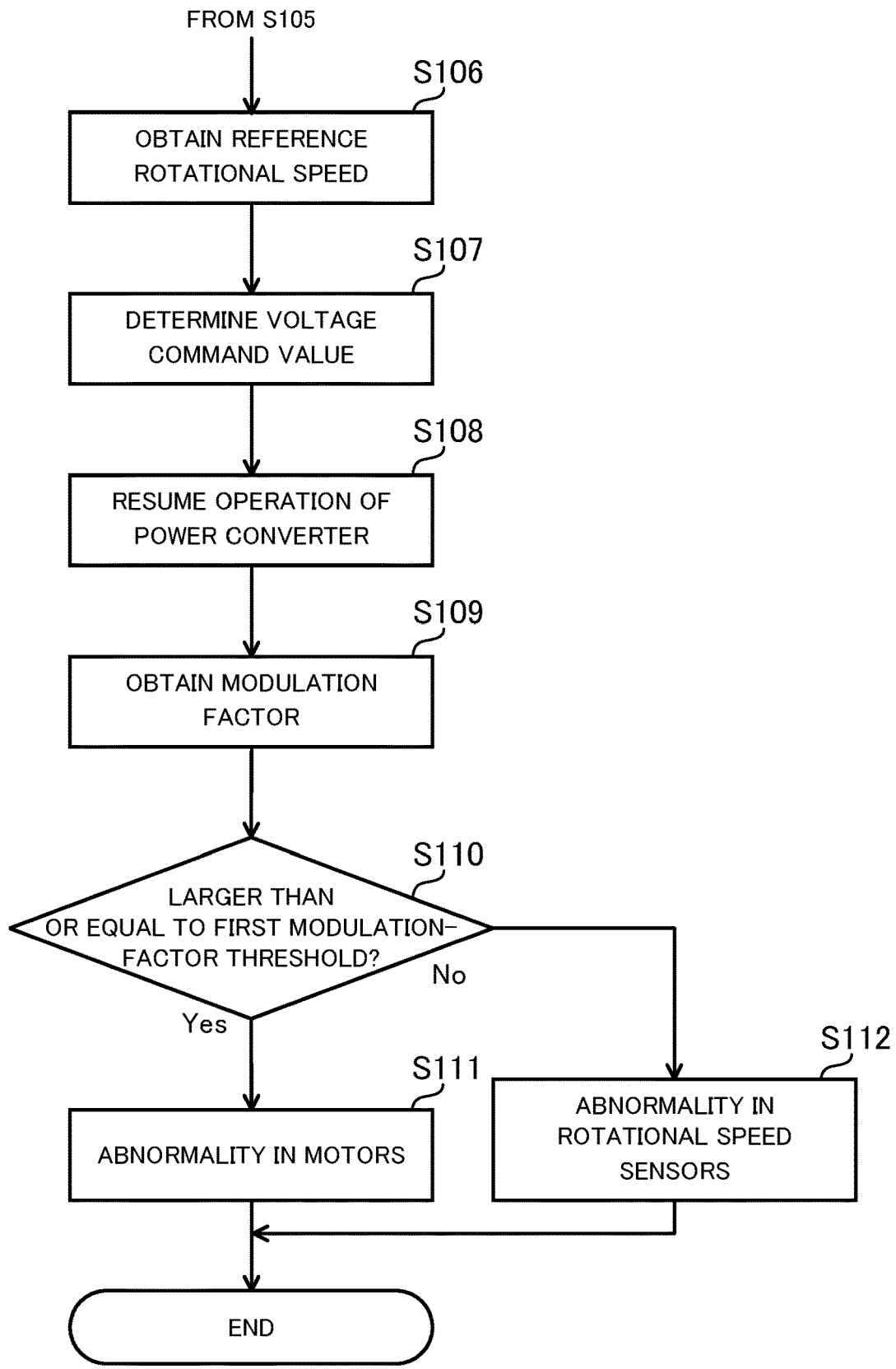
FIG. 5 is a flowchart illustrating the second half of the control process according to Embodiment 1.

The control device 5 initiates the control process illustrated in FIGS. 4 and 5, for example, when the master controller 61 outputs an operation command signal indicating a power running command in response to manipulation of a train operator on the master controller 61 in the electric vehicle 100 standing still. The following assumes that the operation command signal indicating a power running command is being continuously fed to the controller 52 during the control process.

In response to feeding of the operation command signal to the command value determiner 524 and determination of the voltage command value at the command value determiner 524, the power controller 525 controls the operation of the power converter 51. In detail, the reference rotational speed obtainer 523 obtains the second reference rotational speed, which is a reference rotational speed based on the pulse signals from all the rotational speed sensors 4, and the command value determiner 524 determines a voltage command value, on the basis of the operation command signal indicating a power running command, the reference rotational speed information indicating the second reference rotational speed, and current value signals. The power controller 525 causes the power converter 51 to apply a voltage having a value equal to the voltage command value to the motors 3 and thus feed electric power to the motors 3 in a power feeding step (Step S101). The fed power rotates the motors 3 and provide driving forces to the corresponding wheels 2, thus causing the vehicle body 1 to start running in a running step (Step S102).

The suspected abnormal sensor determiner 521 determines the existence of a suspected abnormal sensor, on the basis of the pulse signals output from the respective rotational speed sensors 4, in a suspected-abnormal-sensor determining step (Step S103).

In the suspected-abnormal-sensor determining step, the suspected abnormal sensor determiner 521 waits until the four rotational speed sensors 4 are determined to include a suspected abnormal sensor (Step S103; No). When determining that the four rotational speed sensors 4 include a suspected abnormal sensor, the suspected abnormal sensor determiner 521 outputs a determination signal containing information indicating the existence of a suspected abnormal sensor and information for identifying the suspected abnormal sensor (Step S103: Yes). The determination signal is fed to the selector 522, the power controller 525, and the abnormality determiner 527.

In response to the determination that the rotational speed sensors include a suspected abnormal sensor, the power controller 525 halts the operation of the power converter 51 in a halting step (Step S104).

In parallel to Step S104, the selector 522 selects pulse signals output from the rotational speed sensors 4 other than the suspected abnormal sensor, in a selecting step (Step S105). In detail, the selector 522 stops providing the reference rotational speed obtainer 523 with the pulse signals output from all the rotational speed sensors 4, and starts providing the reference rotational speed obtainer 523 with the pulse signals output from the rotational speed sensors 4 other than the suspected abnormal sensor. Upon completion of the selection of the pulse signals to be provided to the reference rotational speed obtainer 523, the selector 522 feeds a selection completion signal indicating completion of selection of the pulse signals to the power controller 525.

Upon the completion of selection of the pulse signals to be provided to the reference rotational speed obtainer 523, the reference rotational speed obtainer 523 is provided with only the pulse signals output from the rotational speed sensors 4 other than the suspected abnormal sensor. On the basis of the pulse signals output from the rotational speed sensors 4 other than the suspected abnormal sensor, the reference rotational speed obtainer 523 obtains a first reference rotational speed in a reference-rotational-speed obtaining step (Step S106). In detail, on the basis of the pulse signals output from the rotational speed sensors 4 other than the suspected abnormal sensor, the reference rotational speed obtainer 523 obtains, as a first reference rotational speed, the average of the rotational speeds of the motors 3 corresponding to the rotational speed sensors 4 other than the suspected abnormal sensor. Upon obtaining the first reference rotational speed, the reference rotational speed obtainer 523 outputs reference rotational speed information indicating the first reference rotational speed.

On the basis of the operation command signal, the reference rotational speed information, and the current value signals, the command value determiner 524 determines a command value of voltage to be applied to the motors 3 in a command value determining step (Step S107).

The power controller 525, upon receiving the selection completion signal output from the selector 522, causes the power converter 51 to output electric power on the basis of the voltage command value determined by the command value determiner 524. This control resumes the operation of the power converter 51 in a resuming step (Step S108).

In response to the resumption of the operation of the power converter 51, the modulation factor obtainer 526 obtains a modulation factor on the basis of the voltage command value indicated by the command value information output from the command value determiner 524, in a modulation factor obtaining step (Step S109). In detail, the modulation factor obtainer 526 obtains a modulation factor by dividing the voltage command value indicated by the command value information by the maximum output voltage of the control device 5, that is, the maximum output voltage of the power converter 51. The modulation factor obtainer 526 outputs modulation factor information indicating the obtained modulation factor.

The abnormality determiner 527 then determines whether the difference between the modulation factor and the comparative modulation factor is larger than or equal to the first modulation-factor threshold on the basis of the modulation factor information output from the modulation factor obtainer 526, and thus determines whether the four motors 3 or the four rotational speed sensors 4 have an abnormality in an abnormality determining step (Step S110). In detail, the abnormality determiner 527 determines whether the difference between the modulation factor, based on the first reference rotational speed obtained without the pulse signals output from the suspected abnormal sensor, and the comparative modulation factor is larger than or equal to the first modulation-factor threshold.

In an exemplary case where jamming occurs in any of the motors 3, an increase in load on the motor 3 raises the values of current in the motor 3, that is, the current values measured by the current measurers 53, which are described above with reference to FIG. 2, in comparison to the values of current in the case of no jamming in the motors 3. Such increases in the current values provide a lower voltage command value determined by the command value determiner 524 than the voltage command value in the case of no jamming in the motors 3. The modulation factor is accordingly smaller than the modulation factor in the case of no jamming in the motors 3, because the modulation factor is calculated by dividing the voltage command value by the maximum output voltage of the control device 5. The modulation factor has no deviation from the comparative modulation factor provided that no jamming occurs in the motors 3. The determination of whether the difference between the modulation factor and the comparative modulation factor, which is the modulation factor in the case of no jamming in the motors 3, is larger than or equal to the first modulation-factor threshold, thus leads to determination of whether the four motors 3 or the four rotational speed sensor 4 have an abnormality.

When determining that the difference between the modulation factor and the comparative modulation factor is larger than or equal to the first modulation-factor threshold (Step S110; Yes), the abnormality determiner 527 determines that jamming occurs in any of the motors 3, and outputs the first abnormality occurrence information S1 to the power controller 525 (Step S111). The power controller 525, when receiving the first abnormality occurrence information S1, halts the operation of the power converter 51. The first abnormality occurrence information S1 may also be fed to the driver cab 6, which is described above with reference to FIG. 1. The driver cab 6, upon receiving the first abnormality occurrence information S1, may cause the monitor in the driver cab 6 to display information indicating jamming in the motors 3, for example.

In contrast, when determining that the difference between the modulation factor and the comparative modulation factor is smaller than the first modulation-factor threshold (Step S110; No), the abnormality determiner 527 determines that any of the rotational speed sensors 4 has an abnormality, and outputs the second abnormality occurrence information S2 (Step S112). The second abnormality occurrence information S2 is fed to the driver cab 6, which is described above with reference to FIG. 1. The driver cab 6, upon receiving the second abnormality occurrence information S2, causes the monitor in the driver cab 6 to display information indicating an abnormality in the rotational speed sensors 4, for example.

The output of the first abnormality occurrence information S1 or the second abnormality occurrence information S2 from the abnormality determiner 527 is followed by termination of the control process.

As described above, a modulation factor is obtained on the basis of the first reference rotational speed in response to the determination that the rotational speed sensors 4 include a suspected abnormal sensor, in this embodiment. The abnormality determiner 527 determines whether the difference between the modulation factor obtained on the basis of the first reference rotational speed and the comparative modulation factor is larger than or equal to the first modulation-factor threshold, and can thus determine whether the motors 3 or the rotational speed sensors 4 have an abnormality. That is, the embodiment can achieve determination of occurrence of an abnormality in the rotational speed sensors 4.

Figure 6:
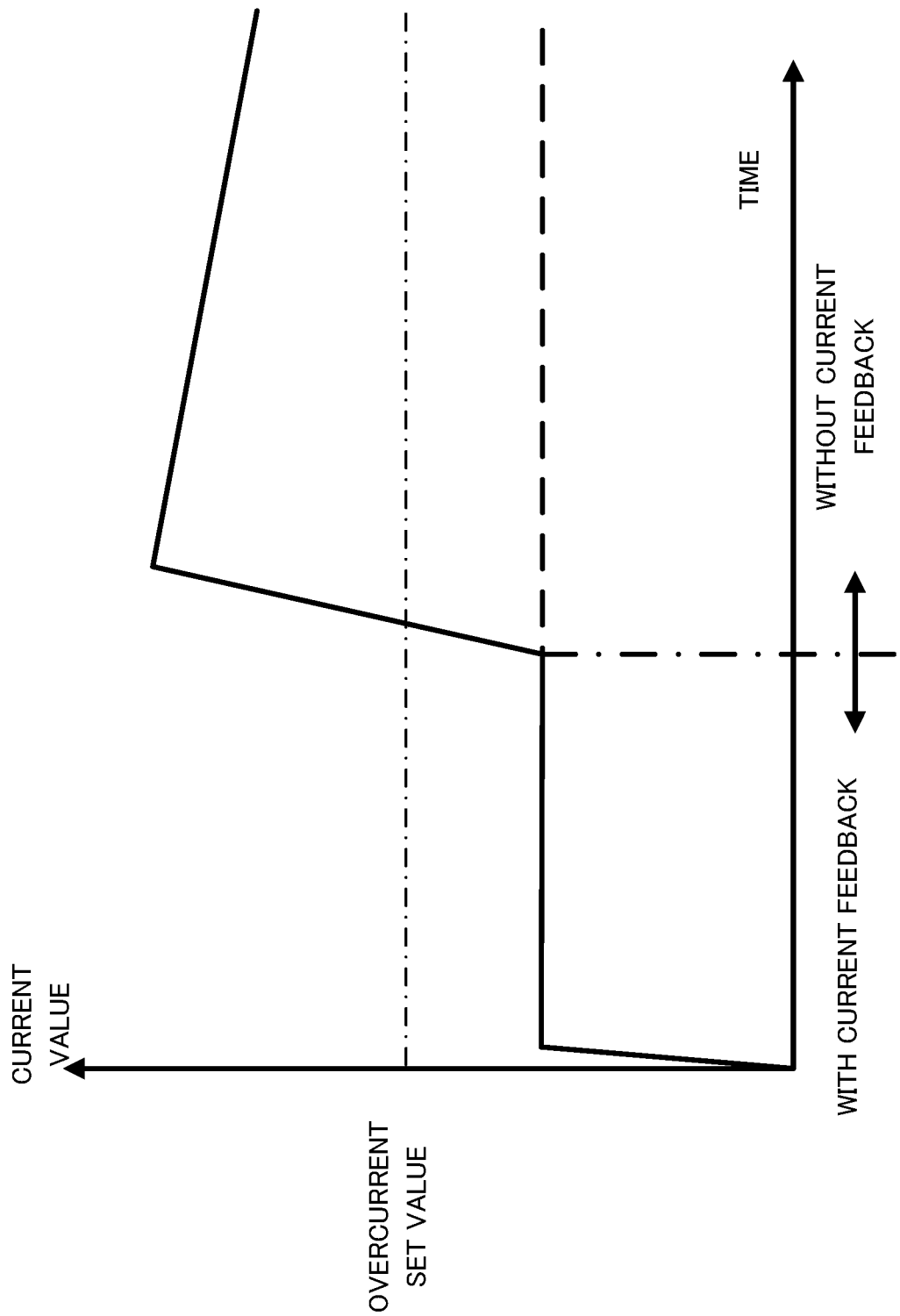
FIG. 6 is a graph illustrating a variation in an output current with and without current feedback according to Embodiment 1.

As illustrated in FIG. 6, an output current has a constant value lower than the "overcurrent set value" during feedback of the output current to the command value determiner 524, regardless of jamming in the motors 3, as is described above with reference to FIG. 3. FIG. 6 is a graph illustrating a variation in a value of current output from the power converter 51 with and without current feedback of the output current to the command value determiner 524. The vertical axis in FIG. 6 represents a value of current output from the power converter 51, and the horizontal axis represents a time from feeding of an operation command signal indicating a power running command. The dashed line in FIG. 6 indicates a value of current output from the power converter 51 in the case of no jamming in the motors 3.

In contrast, the velocity of the vehicle body 1 increases with time and reaches the vehicle velocity threshold, followed by stop of the feedback of the output current to the command value determiner 524. In the case where jamming occurs in any of the motors 3, the value of output current accordingly rises and exceeds the "overcurrent set value". That is, the value of current actually output from the power converter 51 can contribute to detection of jamming in the motors 3, during no feedback of an output current to the command value determiner 524 in the vehicle body 1 running at a velocity equal to or higher than the vehicle velocity threshold. The value of output current, however, cannot contribute to determination of whether jamming occurs in the motors 3, during feedback of an output current to the command value determiner 524 in the vehicle body 1 running at a velocity lower than the vehicle velocity threshold.

Figure 7:
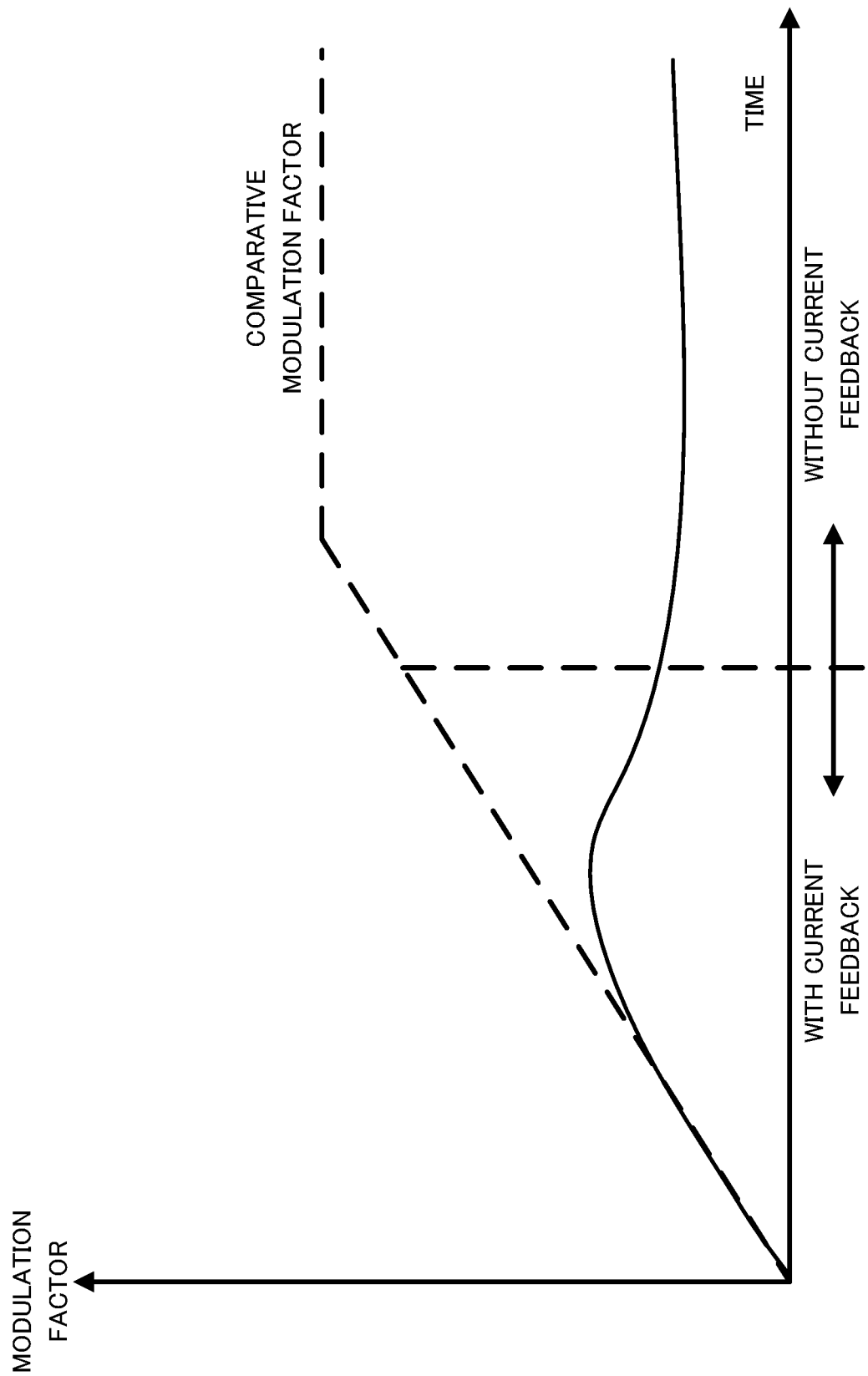
FIG. 7 is a graph illustrating a variation in a modulation factor with and without current feedback according to Embodiment 1.

In contrast, the modulation factor is obtained on the basis of the voltage command value and the maximum output voltage of the control device 5, as is described above with reference to FIG. 3. The modulation factor thus deviates from the comparative modulation factor in the case where jamming occurs in any of the motors 3, with or without the feedback of an output current to the command value determiner 524, as illustrated in FIG. 7. FIG. 7 is a graph illustrating a variation in the modulation factor with and without the feedback of an output current to the command value determiner 524. The vertical axis in FIG. 7 represents a modulation factor, and the horizontal axis represents a time from the feeding of an operation command signal indicating a power running command. The dashed line in FIG. 7 indicates the modulation factor in the case of no jamming in the motors 3, that is, the comparative modulation factor.

As described above, the embodiment can achieve determination of whether the motors 3 or the rotational speed sensors 4 have an abnormality, even during feedback of output currents to the command value determiner 524. The embodiment can thus achieve determination of whether the difference between the modulation factor and the comparative modulation factor is larger than or equal to the first modulation-factor threshold, even during feedback of the output currents to the command value determiner 524 in the vehicle body 1 running at a velocity lower than the vehicle velocity threshold, thus achieving determination of whether the motors 3 or the rotational speed sensors 4 have an abnormality.

The motors 3 in this embodiment require no current detection sensors at the shafts to measure current values of the motors 3. This feature can provide simple structures around the motors 3.

Although the suspected abnormal sensor determiner 521 in this embodiment determines the existence of a suspected abnormal sensor on the basis of whether the frequencies of pulse signals output from the four rotational speed sensors 4 are larger than or equal to the reference frequency in the measurement period, this determination procedure is a mere example. The suspected abnormal sensor determiner 521 may determine the existence of a suspected abnormal sensor through comparison of the pulse signals output from the four rotational speed sensors 4 with one another, for example. In specific, the suspected abnormal sensor determiner 521 may regard the rotational speed sensor 4 that outputs a pulse signal indicating the minimum rotational speed as a suspected abnormal sensor, when the difference in the rotational speed between one rotational speed sensor 4 that outputs the pulse signal indicating the maximum rotational speed and another rotational speed sensor 4 that outputs the pulse signal indicating the minimum rotational speed is larger than a value that is set in advance.

Embodiment 2

Figure 8:
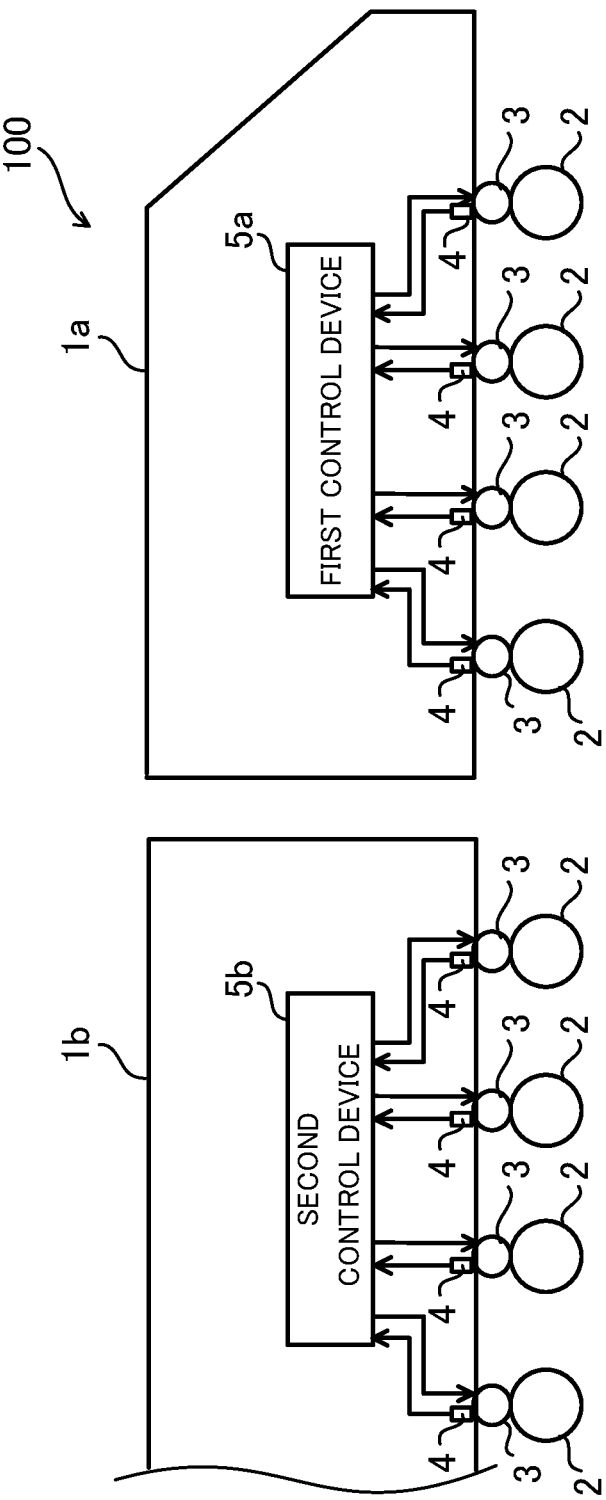
FIG. 8 is a schematic diagram illustrating a configuration of an electric railway vehicle according to Embodiment 2.

The following describes an electric vehicle 100 according to Embodiment 2 with reference to FIG. 8.

Fundamental configuration and operations of the electric vehicle 100 according to Embodiment 2 are similar to those of the electric vehicle 100 according to Embodiment 1. Embodiment 2 differs from Embodiment 1 in that the electric vehicle 100 includes multiple vehicle bodies 1 each provided with a control device 5, and the control device 5 in each vehicle body 1 determines whether jamming occurs in the motors 3 through comparison with the modulation factor obtained in the control device 5 in another vehicle body 1 that is different from the vehicle body 1. That is, in Embodiment 2, the comparative modulation factor described above in Embodiment 1 is replaced with a modulation factor obtained in the control device 5 in the other vehicle body 1. The following focuses on the differences from Embodiment 1.

One of two vehicle bodies 1 provided with separate control devices 5 is hereinafter referred to as "first vehicle body 1a", and the other of the vehicle bodies 1 is referred to as "second vehicle body 1b". The control device 5 provided to the first vehicle body 1a is referred to as "first control device 5a", and the control device 5 provided to the second vehicle body 1b is referred to as "second control device 5b". That is, the first control device Sa and the second control device 5b are provided to separate vehicle bodies 1. The second control device 5b has configuration similar to that of the first control device 5a. The configuration of the first control device 5a and the configuration of the second control device 5b are each similar to that of the control device 5, which is described above with reference to FIGS. 2 and 3.

The description of Embodiment 2 assumes that the suspected abnormal sensor determiner 521 determines that the rotational speed sensors 4 provided for the motors 3 in the first vehicle body 1a in one-to-one correspondence include a suspected abnormal sensor. Similarly to Embodiment 1, the first vehicle body 1a and the second vehicle body 1b in Embodiment 2 each include four motors 3 and four rotational speed sensors 4.

The suspected abnormal sensor determiner 521 determines that the four rotational speed sensors 4 provided for the four motors 3 in the first vehicle body 1a include a suspected abnormal sensor. In response to this determination, the abnormality determiner 527 of the first control device 5a compares the modulation factor in the first control device Sa and the modulation factor in the second control device 5b serving as the comparative modulation factor, and thus determines whether the motors 3 or the rotational speed sensors 4 have an abnormality. In detail, the abnormality determiner 527 determines whether the difference between the modulation factor obtained by the modulation factor obtainer 526 of the first control device 5a and the modulation factor obtained by the modulation factor obtainer 526 of the second control device 5b is larger than or equal to a second modulation-factor threshold that is set in advance. The second modulation-factor threshold is a threshold for determination of whether jamming occurs in the motors 3, as an abnormality in the motors 3, and is another example of "jamming-modulation-factor threshold". The second modulation-factor threshold is stored in the storage area of the controller 52, for example. The modulation factors in the first control device 5a and the second control device 5b are obtained in a procedure similar to that described above in Embodiment 1.

When determining that the difference between the modulation factor in the first control device 5a and the modulation factor in the second control device 5b is larger than or equal to the second modulation-factor threshold, the abnormality determiner 527 of the first control device 5a determines that jamming occurs in the motor 3 corresponding to the suspected abnormal sensor, that is, the motor 3 has an abnormality. In contrast, when determining that the difference between the modulation factor in the first control device 5a and the modulation factor in the second control device 5b is smaller than the second modulation-factor threshold, the abnormality determiner 527 determines that the rotational speed sensor 4 has an abnormality.

Embodiment 2 described above can achieve determination of whether the motors 3 or the rotational speed sensors 4 have an abnormality through comparison with the modulation factor obtained in the control device 5 in the other vehicle body 1 of the electric vehicle 100.

In general, jamming in a motor 3 scarcely occurs. The comparison with the modulation factor obtained in the control device 5 in the other vehicle body 1 can thus further improve the accuracy of determination of whether the motors 3 or the rotational speed sensors 4 have an abnormality.

The second modulation-factor threshold may be equal to or different from the first modulation-factor threshold.

Embodiment 3

Figure 9:
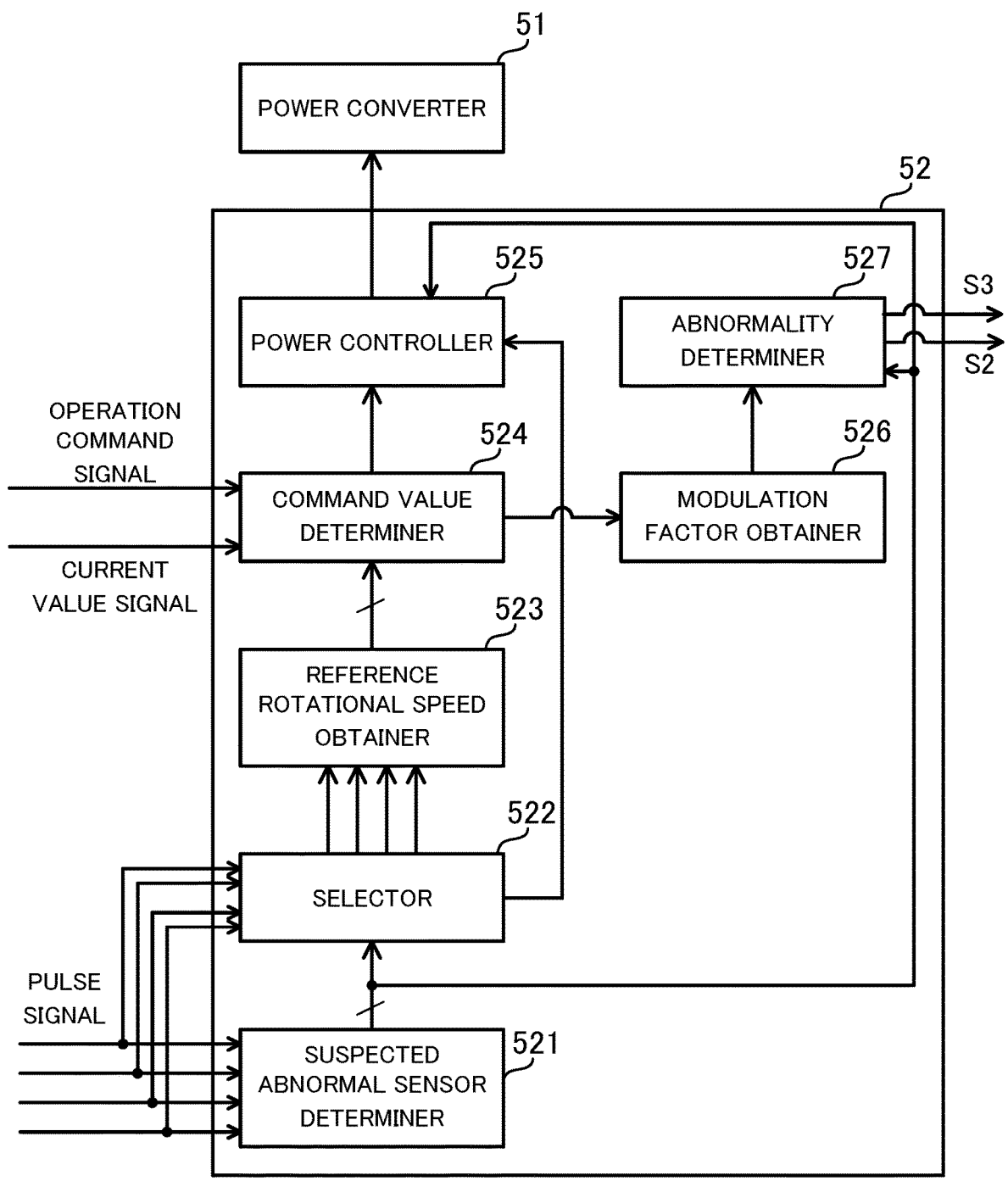
FIG. 9 is a block diagram illustrating a configuration of a controller according to Embodiment 3.

The following describes an electric vehicle 100 according to Embodiment 3 with reference to FIG. 9. Fundamental configuration and operations of the electric vehicle 100 according to Embodiment 3 are similar to those of the electric vehicle 100 according to Embodiment 1 or 2. Embodiment 3 differs from Embodiment 1 or 2 in that Embodiment 3 is aimed at determination of the occurrence of a sign of jamming as an abnormality in the motors 3. The following focuses on the differences from Embodiment 1 or 2. The sign of jamming means a sign appearing prior to the actual occurrence of jamming. The state in which the sign of jamming occurs is a state in which the motor 3 is implied by, for example, a rotational speed of the motor 3 within a speed range defined by a designer or an engineer of the electric vehicle 100. The speed range is defined on the basis of the difference in diameters of the wheels 2, for example. In an exemplary case where the difference in diameters of the wheels 2 is equal to or smaller than 6 mm, the speed range is set to be a range of speed lower than the normal rotational speed of the motors 3 by at least 1%. In the case of occurrence of the sigh of jamming, a motor 3 rotates at a higher rotational speed than in the case of occurrence of jamming.

In order to determine a sign of jamming in the motors 3, the suspected abnormal sensor determiner 521 in Embodiment 3 determines the existence of a suspected abnormal sensor on the basis of the pulse signals output from the respective rotational speed sensors 4. In detail, the suspected abnormal sensor determiner 521 regards the rotational speed sensor 4 that outputs a pulse signal indicating the minimum rotational speed as a suspected abnormal sensor, when the difference between the maximum and minimum rotational speeds among the rotational speeds of the motors 3 is larger than or equal to a rotational-speed threshold that is set in advance. Information indicating the rotational-speed threshold is stored in the storage area of the controller 52, for example. Similarly to Embodiments 1 and 2, four motors 3 and four rotational speed sensors 4 are included in Embodiment 3.

The suspected abnormal sensor determiner 521 obtains the maximum and minimum rotational speeds on the basis of the pulse signals output from the respective rotational speed sensors 4. The suspected abnormal sensor determiner 521 determines whether the difference between the maximum and minimum rotational speeds is larger than or equal to the rotational-speed threshold.

When determining that the difference between the maximum and minimum rotational speeds is larger than or equal to the rotational-speed threshold, the suspected abnormal sensor determiner 521 regards the rotational speed sensor 4 that outputs the pulse signal indicating the minimum rotational speed as a suspected abnormal sensor.

When determining that the rotational speed sensors include a suspected abnormal sensor, the suspected abnormal sensor determiner 521 outputs information indicating the existence of a suspected abnormal sensor in the form of a determination signal. The determination signal is fed to the selector 522, the power controller 525, and the abnormality determiner 527.

The abnormality determiner 527, upon receiving the determination signal indicating the existence of a suspected abnormal sensor from the suspected abnormal sensor determiner 521, determines whether the difference between the modulation factor and the comparative modulation factor is larger than or equal to a third modulation-factor threshold that is set in advance. The third modulation-factor threshold is a threshold for determination of whether a sign of jamming occurs in the motors 3, as an abnormality in the motors 3, and is an example of "sign-modulation-factor threshold". The third modulation-factor threshold is stored in the storage area of the controller 52, for example. The third modulation-factor threshold is set in advance by a designer or an engineer, for example, depending on the level of a sign of jamming in the motors 3. The third modulation-factor threshold is smaller than the first modulation-factor threshold.

In an exemplary case where a sign of jamming occurs in any of the motors 3, an increase in load on the motor 3 raises the values of current in the motor 3, which are measured by the current measurers 53 and actually output from the power converter 51 as described above with reference to FIG. 2. Such increases in the current values provide a lower voltage command value determined by the command value determiner 524 illustrated in FIG. 9 than the voltage command value in the case of no sign of jamming in the motors 3. The modulation factor is accordingly smaller than the modulation factor in the case of no jamming in the motors 3. The modulation factor has no deviation from the comparative modulation factor provided that no jamming occurs in the motors 3.

The abnormality determiner 527, when determining that the difference between the modulation factor and the comparative modulation factor is larger than or equal to the third modulation-factor threshold, determines that a sigh of occurrence of jamming in the motors 3 exists, and outputs third abnormality occurrence information S3 indicating the existence of a sign of jamming in the motors 3. The third abnormality occurrence information S3 in this embodiment is fed to the driver cab 6, similarly to the second abnormality occurrence information S2. The driver cab 6, upon receiving the third abnormality occurrence information S3, causes the monitor in the driver cab 6 to display information indicating the occurrence of a sign of jamming in the motors 3, for example.

Embodiment 3 described above can achieve determination of whether the difference between the modulation factor and the comparative modulation factor is larger than or equal to the third modulation-factor threshold that is set in advance, thus achieving determination of whether a sign of jamming occurs in the motors 3.

The above-described embodiments are not to be construed as limiting the scope of the present disclosure. Other embodiments as a result of appropriate modifications are also available.

For example, Embodiments 1 to 3 may be appropriately combined with one another. In detail, the abnormality determiner 527 may determine whether a sign of jamming occurs in the motors 3 as in Embodiment 3, through comparison with the modulation factor obtained in the control device 5 in the other vehicle body 1 as in Embodiment 2. The suspected abnormal sensor determiner 521 may output a determination signal containing both pieces of information described in Embodiments 1 and 3. In this case, the abnormality determiner 527 outputs the first abnormality occurrence information S1, when receiving a determination signal indicating the existence of a suspected abnormal sensor implying occurrence of jamming, from the suspected abnormal sensor determiner 521. The abnormality determiner 527 outputs the third abnormality occurrence information S3, when receiving a determination signal indicating the existence of a suspected abnormal sensor implying a motor 3 showing a sign of jamming. These two types of abnormality occurrence information enable the control device 5 to discriminate the occurrence of jamming in the motors 3, the occurrence of a sign of jamming in the motors 3, and the occurrence of an abnormality in the rotational speed sensors 4 from one another.

Although each control device 5 feeds electric power to four motors 3 in the present disclosure, this configuration is a mere example. The number of motors 3 fed with electric power from each control device 5 may be any number at least two.

Although the power converter 51 includes the inverter unit, this configuration is a mere example. The power converter 51 may include any power conversion unit.

Although the control devices 5 are installed in motor cars, this configuration is a mere example. The control devices 5 may also be installed in the vehicle bodies 1 other than motor cars. In this case, the control devices 5 are connected to the motors 3 and the rotational speed sensors 4 with cables, for example.

REFERENCE SIGNS LIST

1 Vehicle body
1a First vehicle body
1b Second vehicle body
2 Wheel
3 Motor
4 Rotational speed sensor (first suspected abnormal sensor, second suspected abnormal sensor)
5 Control device
6 Driver cab
51 Power converter
52 Controller
53 Current measurer
5a First control device
5b Second control device
61 Master controller
100 Electric vehicle
521 Suspected abnormal sensor determiner
522 Selector
523 Reference rotational speed obtainer
524 Command value determiner
525 Power controller
526 Modulation factor obtainer
527 Abnormality determiner
S1 First abnormality occurrence information
S2 Second abnormality occurrence information
S3 Third abnormality occurrence information

The invention claimed is:
1. A control device for controlling operations of a plurality of motors of an electric railway vehicle running in accordance with an operation command signal, the control device comprising:

power converting circuitry to feed electric power to each of the plurality of motors;

suspected abnormal sensor determining circuitry to determine, based on signals that are output from a plurality of rotational speed sensors provided for the plurality of motors in one-to-one correspondence and that indicate rotational speeds of the plurality of motors, whether the plurality of rotational speed sensors include a suspected abnormal sensor suspected of having an abnormality, each of the signals being output from a corresponding rotational speed sensor of the plurality of rotational speed sensors and indicating a rotational speed of a corresponding motor of the plurality of motors;

reference rotational speed obtaining circuitry to obtain a reference rotational speed, based on one or more signals that are output from the plurality of rotational speed sensors other than the suspected abnormal sensor and that each indicate the rotational speed, when the suspected abnormal sensor determining circuitry determines that the plurality of rotational speed sensors include the suspected abnormal sensor, each of the one or more signals being output from a corresponding rotational speed sensor of the plurality of rotational speed sensors other than the suspected abnormal sensor;

command value determining circuitry to determine a command value of voltage to be output from the power converting circuitry, based on the operation command signal, the reference rotational speed, and values of current fed from the power converting circuitry to the plurality of motors;

modulation factor obtaining circuitry to obtain a modulation factor, based on the command value of voltage; and abnormality determining circuitry to determine that a motor of the plurality of motors that corresponds to the suspected abnormal sensor has an abnormality, when a difference between the modulation factor and a comparative modulation factor that is set in advance is larger than or equal to a modulation-factor threshold, and determine that the suspected abnormal sensor has an abnormality, when the difference between the modulation factor and the comparative modulation factor is smaller than the modulation-factor threshold.

2. The control device according to claim 1, wherein the suspected abnormal sensor determining circuitry obtains a maximum value and a minimum value of the rotational speeds, based on the signals that are output from the plurality of rotational speed sensors and that each indicate the rotational speed, and when determining that a difference between the maximum value and the minimum value of the rotational speeds is larger than or equal to a rotational-speed threshold, regards a rotational speed sensor that outputs a signal indicating the minimum value of the rotational speeds as the suspected abnormal sensor.

3. The control device according to claim 2, wherein the modulation-factor threshold includes a jamming-modulation-factor threshold designed for determination of whether jamming occurs in the plurality of motors as an abnormality in the plurality of motors, and when the difference between the modulation factor and the comparative modulation factor is larger than or equal to the jamming-modulation-factor threshold, the abnormality determining circuitry determines that jamming occurs in the motor corresponding to the suspected abnormal sensor.

4. The control device according to claim 3, wherein, when the rotational speeds of the plurality of motors are lower than a threshold speed, the command value determining circuitry determines the command value of voltage, based on the operation command signal, the reference rotational speed, and the values of current fed from the power converting circuitry to the plurality of motors, within such a range that the values of current fed from the power converting circuitry to the plurality of motors are equal to or lower than a reference value.

5. The control device according to claim 2, wherein the modulation-factor threshold includes a sign-modulation-factor threshold designed for determination of whether a sign of jamming occurs in the plurality of motors as an abnormality in the plurality of motors, and when the difference between the modulation factor and the comparative modulation factor is larger than or equal to the sign-modulation-factor threshold, the abnormality determining circuitry determines that a sign of jamming occurs in the motor corresponding to the suspected abnormal sensor.

6. The control device according to claim 5, wherein, when the rotational speeds of the plurality of motors are lower than a threshold speed, the command value determining circuitry determines the command value of voltage, based on the operation command signal, the reference rotational speed, and the values of current fed from the power converting circuitry to the plurality of motors, within such a range that the values of current fed from the power converting circuitry to the plurality of motors are equal to or lower than a reference value.

7. The control device according to claim 2, wherein, when the rotational speeds of the plurality of motors are lower than a threshold speed, the command value determining circuitry determines the command value of voltage, based on the operation command signal, the reference rotational speed, and the values of current fed from the power converting circuitry to the plurality of motors, within such a range that the values of current fed from the power converting circuitry to the plurality of motors are equal to or lower than a reference value.

8. The control device according to claim 1, wherein the modulation-factor threshold includes a jamming-modulation-factor threshold designed for determination of whether jamming occurs in the plurality of motors as an abnormality in the plurality of motors, and when the difference between the modulation factor and the comparative modulation factor is larger than or equal to the jamming-modulation-factor threshold, the abnormality determining circuitry determines that jamming occurs in the motor corresponding to the suspected abnormal sensor.

9. The control device according to claim 8, wherein, when the rotational speeds of the plurality of motors are lower than a threshold speed, the command value determining circuitry determines the command value of voltage, based on the operation command signal, the reference rotational speed, and the values of current fed from the power converting circuitry to the plurality of motors, within such a range that the values of current fed from the power converting circuitry to the plurality of motors are equal to or lower than a reference value.

10. The control device according to claim 1, wherein, when the rotational speeds of the plurality of motors are lower than a threshold speed, the command value determining circuitry determines the command value of voltage, based on the operation command signal, the reference rotational speed, and the values of current fed from the power converting circuitry to the plurality of motors, within such a range that the values of current fed from the power converting circuitry to the plurality of motors are equal to or lower than a reference value.

11. An electric railway vehicle, comprising:
a plurality of the control devices according to claim 1, the plurality of control devices including a first control device and a second control device different from the first control device, wherein
the abnormality determining circuitry included in the first control device determines whether the plurality of motors or the plurality of rotational speed sensors have an abnormality, through comparison between (i) a modulation factor in the first control device as the modulation factor and (ii) a modulation factor in the second control device as the comparative modulation factor.

12. An electric railway vehicle, comprising:
a plurality of the control devices according to claim 2, the plurality of control devices including a first control device and a second control device different from the first control device, wherein
the abnormality determining circuitry included in the first control device determines whether the plurality of motors or the plurality of rotational speed sensors have an abnormality, through comparison between (i) a modulation factor in the first control device as the modulation factor and (ii) a modulation factor in the second control device as the comparative modulation factor.

13. An electric railway vehicle, comprising:
a plurality of the control devices according to claim 3, the plurality of control devices including a first control device and a second control device different from the first control device, wherein
the abnormality determining circuitry included in the first control device determines whether the plurality of motors or the plurality of rotational speed sensors have an abnormality, through comparison between (i) a modulation factor in the first control device as the modulation factor and (ii) a modulation factor in the second control device as the comparative modulation factor.

14. An electric railway vehicle, comprising:
a plurality of the control devices according to claim 4, the plurality of control devices including a first control device and a second control device different from the first control device, wherein
the abnormality determining circuitry included in the first control device determines whether the plurality of motors or the plurality of rotational speed sensors have an abnormality, through comparison between (i) a modulation factor in the first control device as the modulation factor and (ii) a modulation factor in the second control device as the comparative modulation factor.

15. An electric railway vehicle, comprising:
a plurality of the control devices according to claim 5, the plurality of control devices including a first control device and a second control device different from the first control device, wherein
the abnormality determining circuitry included in the first control device determines whether the plurality of motors or the plurality of rotational speed sensors have an abnormality, through comparison between (i) a modulation factor in the first control device as the modulation factor and (ii) a modulation factor in the second control device as the comparative modulation factor.

16. An electric railway vehicle, comprising:
a plurality of the control devices according to claim 7, the plurality of control devices including a first control device and a second control device different from the first control device, wherein
the abnormality determining circuitry included in the first control device determines whether the plurality of motors or the plurality of rotational speed sensors have an abnormality, through comparison between (i) a modulation factor in the first control device as the modulation factor and (ii) a modulation factor in the second control device as the comparative modulation factor.

17. An electric railway vehicle, comprising:
a plurality of the control devices according to claim 8, the plurality of control devices including a first control device and a second control device different from the first control device, wherein
the abnormality determining circuitry included in the first control device determines whether the plurality of motors or the plurality of rotational speed sensors have an abnormality, through comparison between (i) a modulation factor in the first control device as the modulation factor and (ii) a modulation factor in the second control device as the comparative modulation factor.

18. An electric railway vehicle, comprising:
a plurality of the control devices according to claim 9, the plurality of control devices including a first control device and a second control device different from the first control device, wherein
the abnormality determining circuitry included in the first control device determines whether the plurality of motors or the plurality of rotational speed sensors have an abnormality, through comparison between (i) a modulation factor in the first control device as the modulation factor and (ii) a modulation factor in the second control device as the comparative modulation factor.

19. An electric railway vehicle, comprising:
a plurality of the control devices according to claim 10, the plurality of control devices including a first control device and a second control device different from the first control device, wherein
the abnormality determining circuitry included in the first control device determines whether the plurality of motors or the plurality of rotational speed sensors have an abnormality, through comparison between (i) a modulation factor in the first control device as the modulation factor and (ii) a modulation factor in the second control device as the comparative modulation factor.

20. A control method for controlling operations of a plurality of motors of an electric railway vehicle running in accordance with an operation command signal, the control method comprising:
feeding electric power to each of the plurality of motors;
determining, based on signals that are output from a plurality of rotational speed sensors provided for the plurality of motors in one-to-one correspondence and that indicate rotational speeds of the plurality of motors, that the plurality of rotational speed sensors include a suspected abnormal sensor suspected of having an abnormality, each of the signals being output from a corresponding rotational speed sensor of the plurality of rotational speed sensors and indicating a rotational speed of a corresponding motor of the plurality of motors;

obtaining a reference rotational speed, based on one or more signals that are output from the plurality of rotational speed sensors other than the suspected abnormal sensor and that each indicate the rotational speed, when the plurality of rotational speed sensors are determined to include the suspected abnormal sensor, each of the one or more signals being output from a corresponding rotational speed sensor of the plurality of rotational speed sensors other than the suspected abnormal sensor;

determining a command value of voltage to be applied to the plurality of motors, based on the operation command signal, the reference rotational speed, and values of current fed to the plurality of motors in the feeding of the electric power;

obtaining a modulation factor, based on the command value of voltage; and determining that a motor of the plurality of motors that corresponds to the suspected abnormal sensor has an abnormality, when a difference between the modulation factor and a comparative modulation factor that is set in advance is larger than or equal to a modulation- factor threshold, and determining that the suspected abnormal sensor has an abnormality, when the difference between the modulation factor and the comparative modulation factor is smaller than the modulation-factor threshold.

* * * * *